E. A. Kelsey.
Coffee Pot.

No. 32,876. Patented Jan. 23, 1861.

Witnesses.
H. Coombs
G. W. Reed

Inventor.
E. A. Kelsey
per Munn & Co.
Attorneys

UNITED STATES PATENT OFFICE.

E. A. KELSEY, OF MERIDEN, CONNECTICUT.

COFFEE AND TEA POT.

Specification of Letters Patent No. 32,876, dated July 23, 1861.

*To all whom it may concern:*

Be it known that I, E. A. KELSEY, of Meriden, in the county of New Haven and State of Connecticut, have invented a new and useful Improvement in the Construction of Tinned-Plate Coffee and Tea Pots; and I do hereby declare that the following is a full, clear, and exact description of the same, reference being had to the annexed drawings, making part of this specification, in which—

Figure 2:
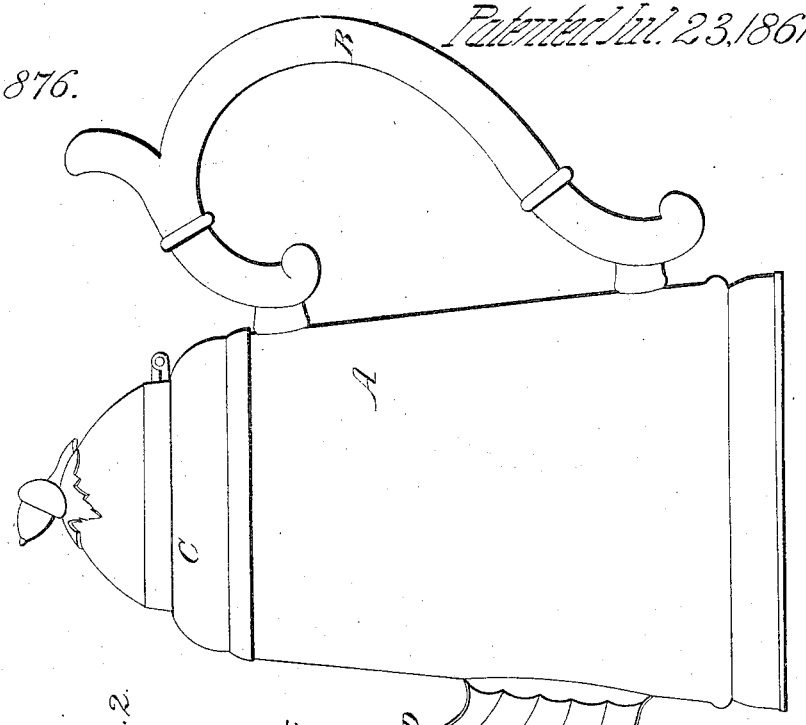
Figure 3:
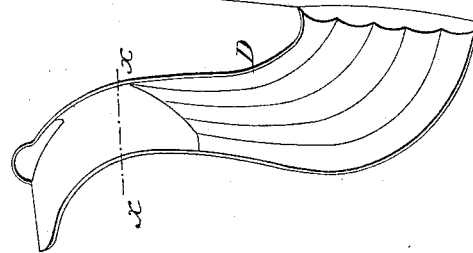
Figure 3:
Figure 1:
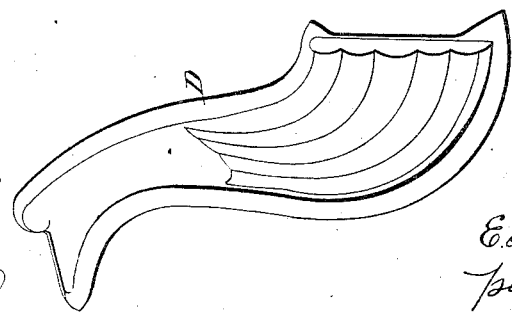

Figure 1, is a detached longitudinal central section of the spout of a coffee or tea pot constructed according to my invention; Fig. 2, a side view of the same, applied to a coffee or tea pot; and Fig. 3, a transverse section of the spout, taken in the line $x$, $x$, of Fig. 2.

Similar letters of reference indicate corresponding parts in the several figures.

In the construction of common or cheap coffee or tea pots, which are manufactured wholly of tinned-plate, straight conical tinned spouts or those slightly curved have been used, no other cheap form of spout having hitherto been devised. These straight or slightly curved tinned spouts have an exceedingly homely appearance and other parts of the pot which might be made neat and ornamental at a trifling expense are necessarily made plain in order to correspond with the spout. In the more expensive kinds of tinned-plate coffee and tea pots, britannia-metal spouts cast in molds have been used, the same being soldered to the tinned body of the pot. These spouts admit of being made quite ornamental; but they are comparatively expensive and the soldering of them to the bodies of the pots is attended with a considerable expenditure of time.

The within-described invention consists in constructing the spouts of tinned-plate swaged in proper form and in two equal longitudinal parts which are connected together and to the pot by solder. By this means I obtain an ornamental tinned-plate spout equally as ornamental as the britannia-metal ones and far cheaper.

To enable those skilled in the art to fully understand and construct my invention, I will proceed to describe it.

The body, A, of the coffee or tea pot may be made in any of the usual forms and provided with an ornamental or neat handle, B, as well as an ornamental cover, C.

D, is the spout of the coffee or tea pot. This spout, like the body A of the pot, is made of tinned-plate and of two equal longitudinal parts, $a$ $a$. These parts $a$ $a$, are struck up in proper form by means of dies, and then cemented together by solder. The spout is then secured to the body A, by soldering in the ordinary way. By constructing the spout D in this manner, a very cheap and ornamental one may be obtained, and a coffee or tea pot may be manufactured which will compare favorably with those of britannia-metal and without costing more than the ordinary ones constructed of tinned-plate. Any form of spout may be swaged or struck up by dies, and as large quantities of one pattern will invariably be made, the cost of the dies are quite inappreciable. Thus, by this simple means, a very ornamental and cheap coffee and tea pot is obtained.

I do not claim broadly or in the abstract the swaging of tinned-plate, for that means has been employed in various instances for giving form to different articles; but,

Having thus described my invention, what I do claim as new and desire to secure by Letters Patent, as a new and improved article of manufacture, is:

A coffee or tea pot, constructed of tinned-plate, with a nozzle or spout, D, of the same material, swaged or struck up in proper form by means of dies, substantially as set forth.

E. A. KELSEY.

Witnesses:
A. H. CURTIS,
NOAH P. IVES.